May 1, 1962 G. T. GRAY 3,031,955
PRINTER
Original Filed June 26, 1958 7 Sheets-Sheet 1
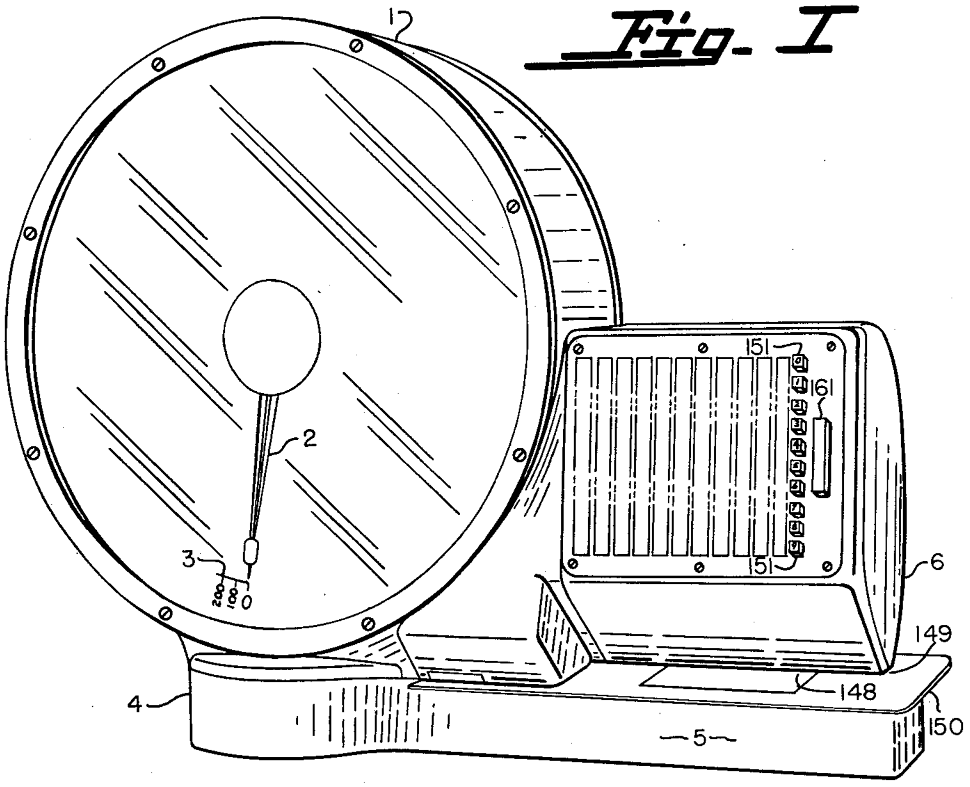
Fig. I
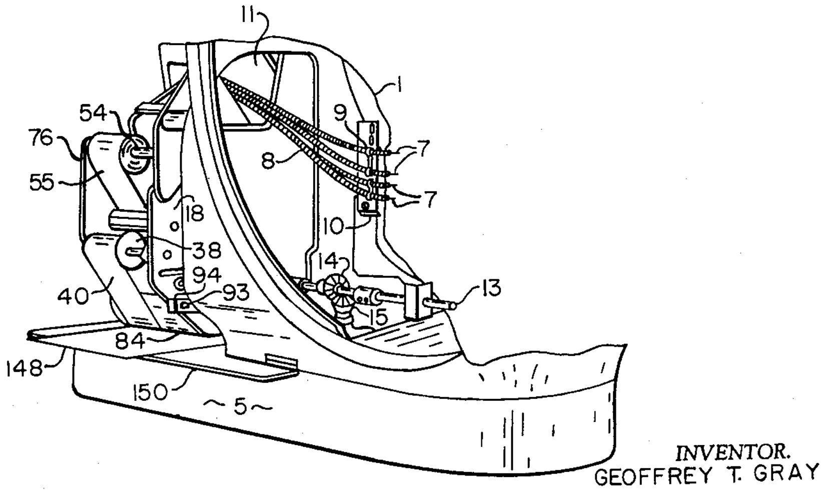
Fig. II
INVENTOR.
GEOFFREY T. GRAY
BY
Marshall, Marshall & Yeasting
ATTORNEYS

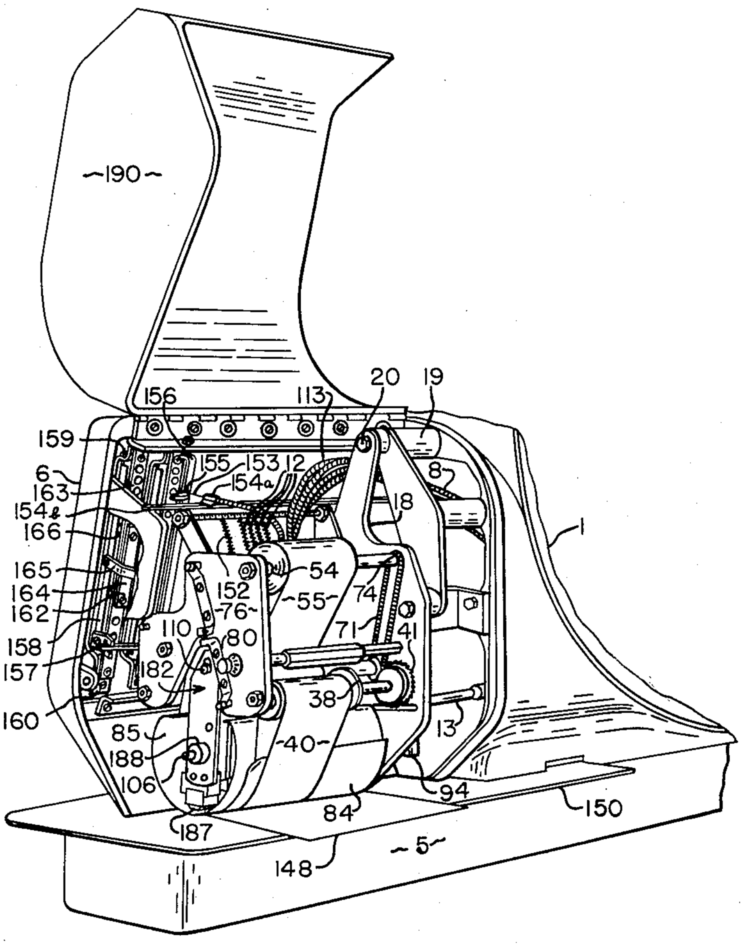
Fig. III
INVENTOR.
GEOFFREY T. GRAY
BY
Marshall, Marshall & Yeasting
ATTORNEYS

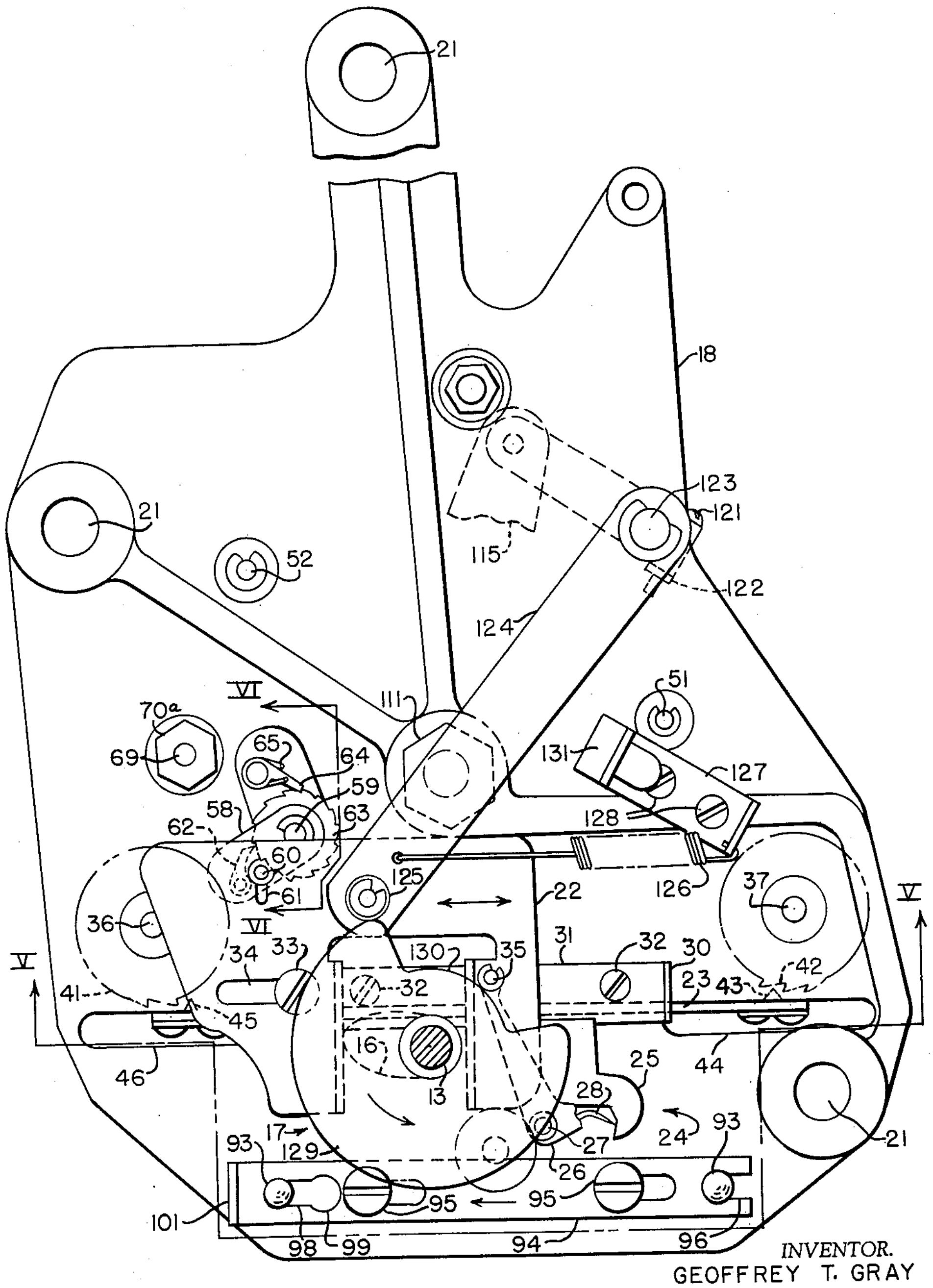
Fig. IV
INVENTOR.
GEOFFREY T. GRAY
BY
Marshall, Marshall & Yeasting
ATTORNEYS

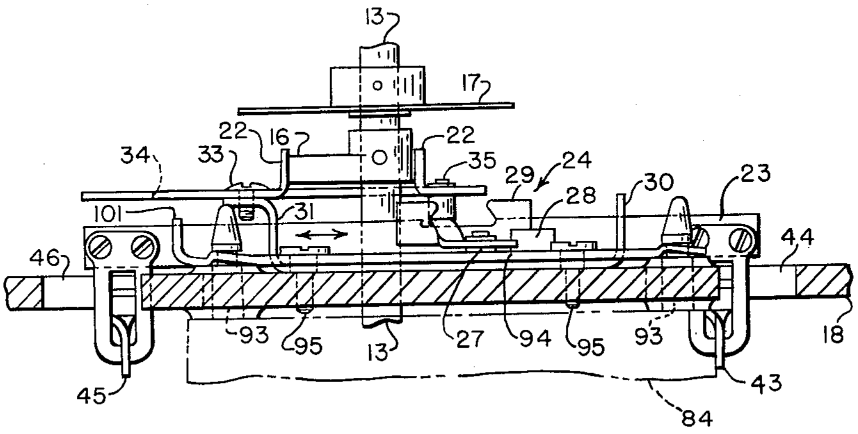
Fig. V
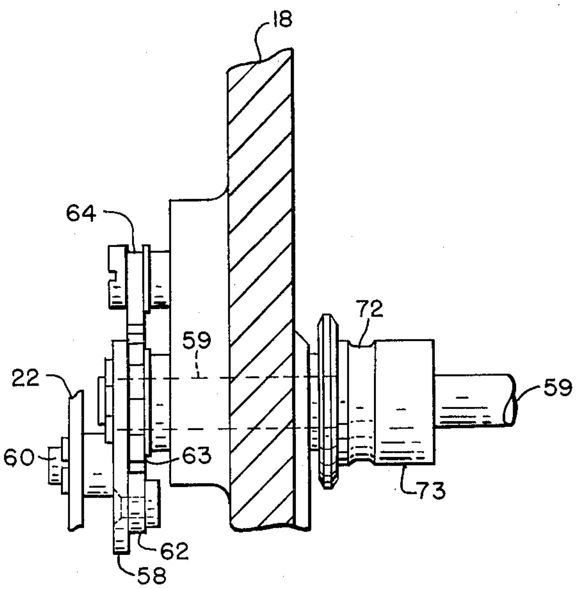
Fig. VI
INVENTOR.
GEOFFREY T. GRAY
BY
Marshall, Marshall & Yeasting
ATTORNEYS May 1, 1962 G. T. GRAY 3,031,955
PRINTER
Original Filed June 26, 1958 7 Sheets-Sheet 5
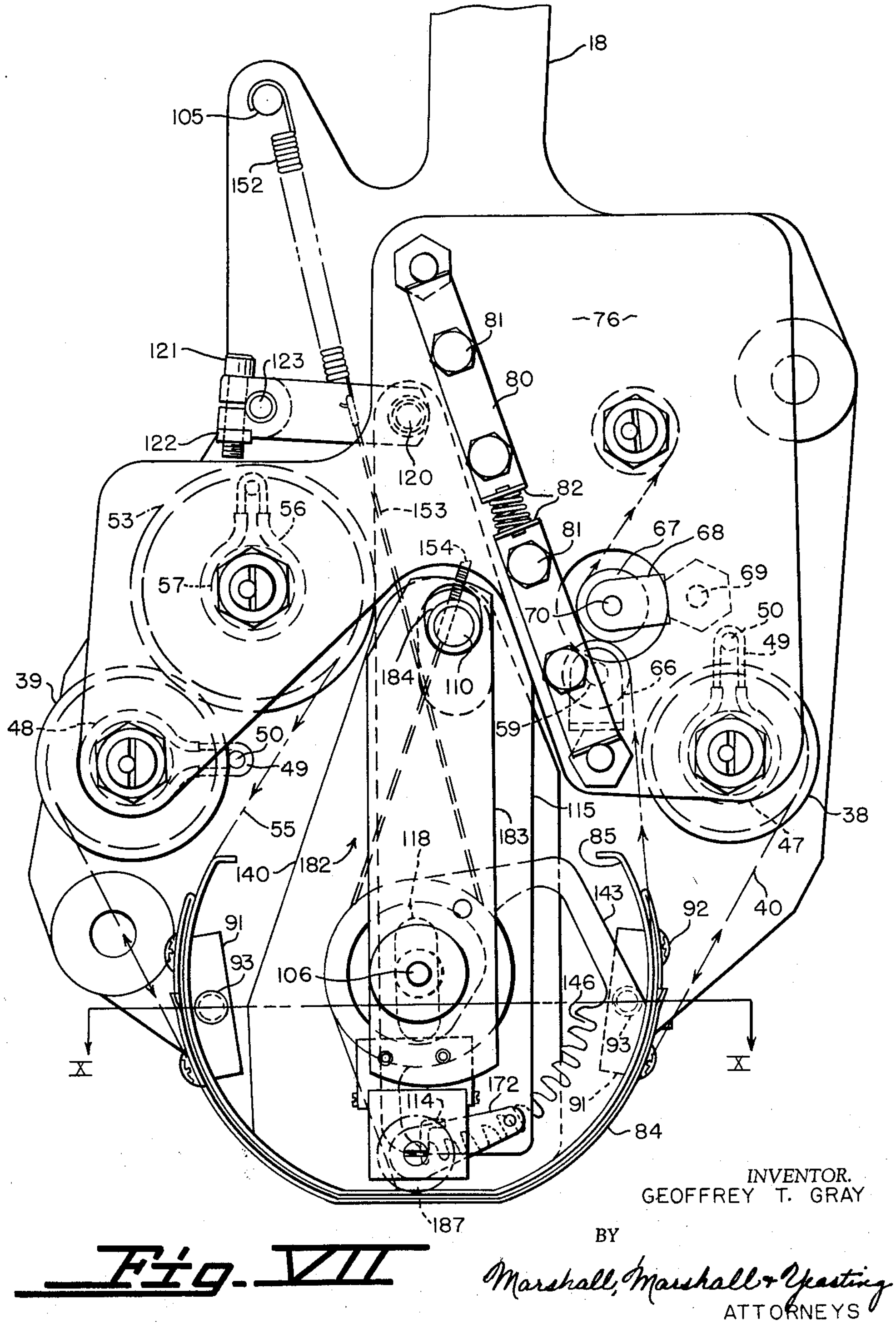
Fig. VII
INVENTOR.
GEOFFREY T. GRAY
BY
Marshall, Marshall & Yeasting
ATTORNEYS

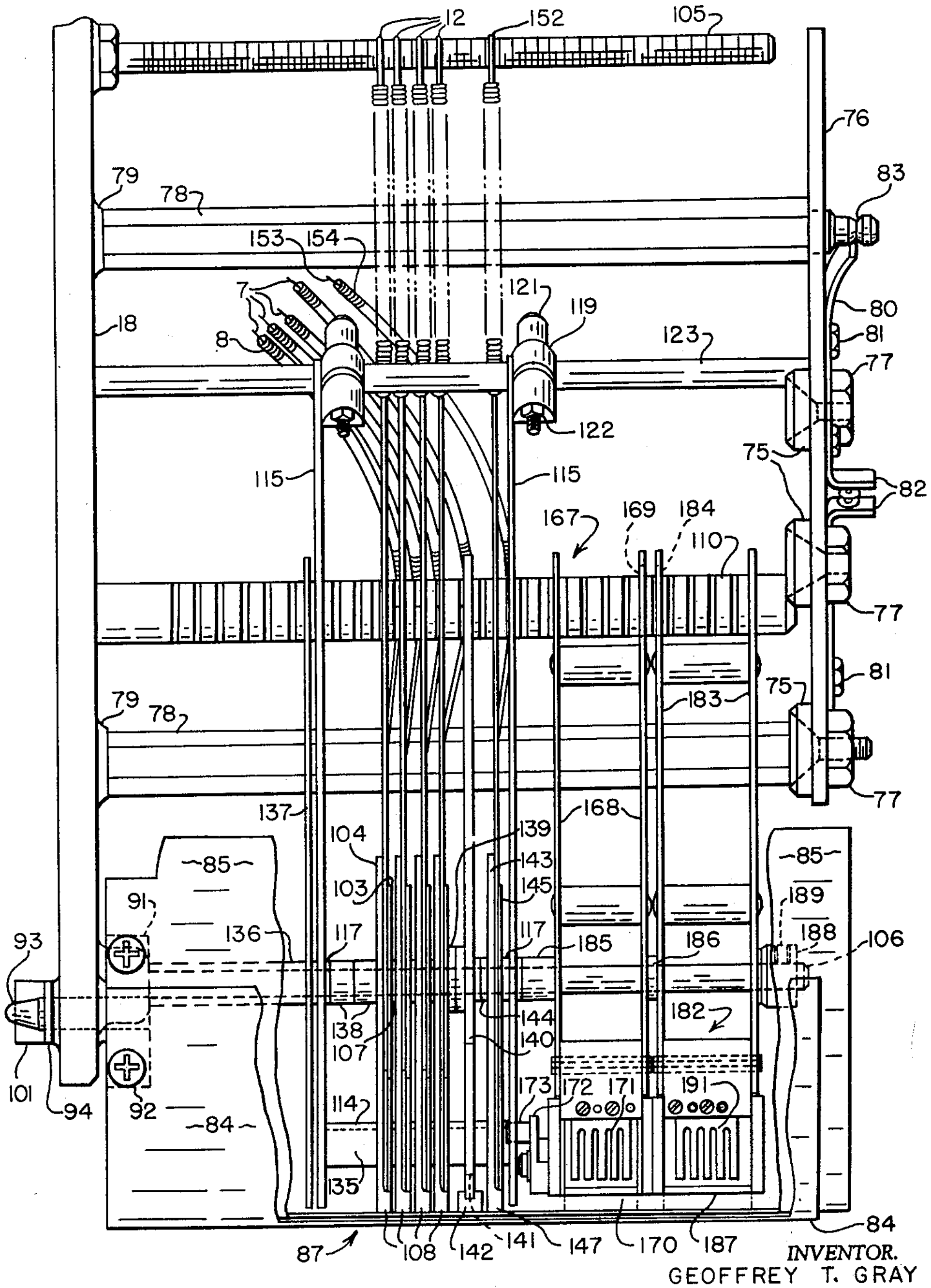
Fig. VIII
INVENTOR.
GEOFFREY T. GRAY
BY
Marshall, Marshall & Yeasting
ATTORNEYS PRINTER
Original Filed June 26, 1958 7 Sheets-Sheet 7
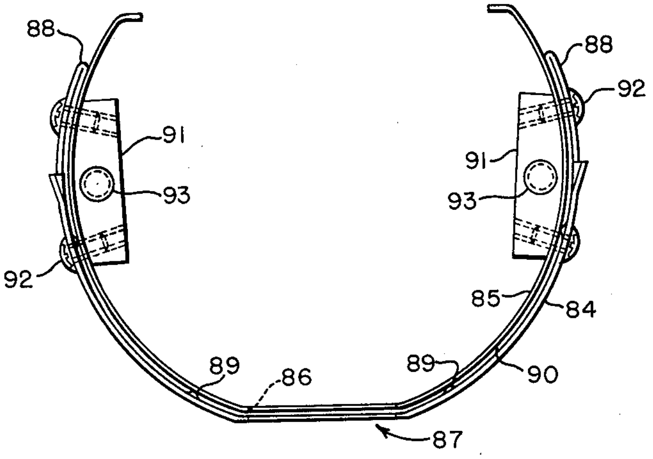
Fig. IX
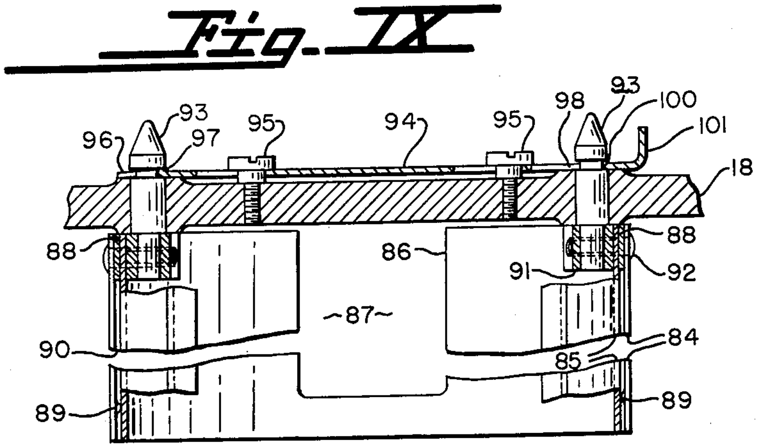
Fig. X
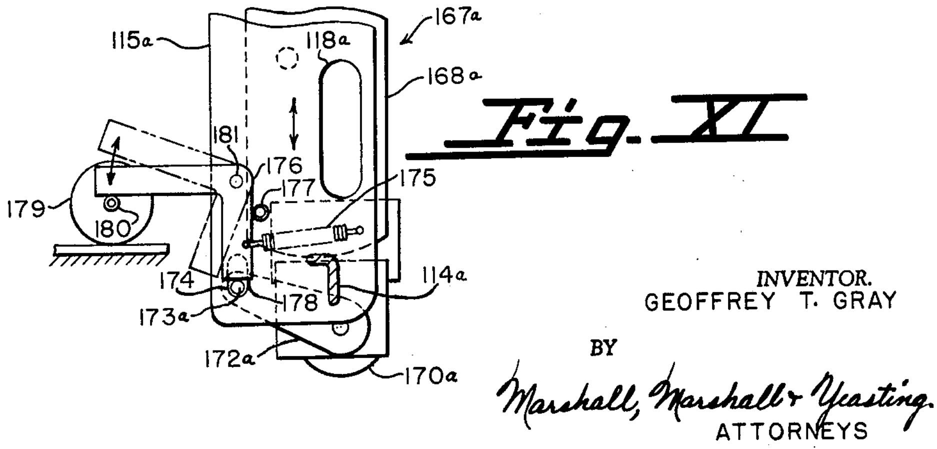
Fig. XI
INVENTOR.
GEOFFREY T. GRAY
BY
Marshall, Marshall & Yeasting
ATTORNEYS United States Patent Office 3,031,955

Patented May 1, 1962

3,031,955
PRINTER

Geoffrey T. Gray, Toledo, Ohio, assignor to Toledo Scale Corporation, Toledo, Ohio, a corporation of Ohio Original application June 26, 1958, Ser. No. 744,754. Divided and this application May 11, 1959, Ser. No. 812,409

3 Claims. (Cl. 101—96)

This device relates to an improved printing device.

The improved printing device is of simple and low cost construction, yet is rugged, reliable and accurate, and is particularly well suited for use in industrial installations. It is especially useful in industrial installations in conjunction with a weighing scale for printing weight indications in digital form.

The principal object of the invention is to provide a printer with easy means of access to all of its working parts so that it is easy to clean and service.

Another object of the invention is to provide a printer with easily removable means for guiding an ink ribbon and a record strip or the ribbon alone through and for supporting the ink ribbon and the record strip or the ribbon alone in a printing station.

Other objects and advantages will be apparent from the following description in which reference is had to the accompanying drawings.

According to the invention, a printer is provided with easily removable means for guiding an ink ribbon and a record strip or the ribbon alone through and for supporting the ink ribbon and the record strip or the ribbon alone in a printing station. The printer has a basic printing mechanism which is shown and described in detail in U.S. application Serial No. 693,975, filed November 1, 1957 in the names of Clarence E. Adler and Geoffrey T. Gray, now Patent No. 2,922,361, to which auxiliary printing mechanisms are added in various arrangements to suit various printing applications. The auxiliary printing mechanisms include a selective number device for printing weight identification characters such as "Ore," "Limestone," "Tare," "Gross" and "Net" and selective numbers such as customer order or code numbers, a consecutive number device for printing a consecutive number adjacent each weight print, and time and date stamps. Such devices and stamps are so mounted and so positionable in the printer that there is flexibility of positioning of the printed matter. Also gaps can be left in the printed lines for the use of customers. The printer features easy access to all of its working parts which makes it easy to clean and service, the printer having improved removable ink ribbon or ink ribbon and record strip guides to facilitate cleaning the printing type.

A preferred form of the printer is illustrated in the accompanying drawings.

In the drawings:

FIG. I is a perspective view of a weighing scale dial mechanism showing the location of the printer as it is mounted on a weighing scale;

FIG. II is a fragmentary perspective view of the printer with part of its case removed to reveal the printing mechanism;

FIG. III is a perspective view from another angle of the printer with the case in place but opened up to reveal the printing mechanism;

FIG. IV is an enlarged elevational view of the end of the printer which may be seen in FIG. II;

FIG. V is a horizontal sectional view taken along the line V—V of FIG. IV;

FIG. VI is a vertical sectional view taken along the line VI—VI of FIG. IV;

FIG. VII is an enlarged end elevational view of the printer as seen from a position at the left of FIG. III looking toward the printer;

FIG. VIII is an enlarged, fragmentary front elevational view as seen from a position in front of FIG. I looking toward the printer, the case being removed to reveal the inner mechanism;

FIG. IX is an end elevational view of the ink ribbon and record strip guides which are removable from the printer as a unit assembly and which are illustrated in a similar view in their position in the printer in FIG. VII;

FIG. X is a horizontal sectional view of the ink ribbon and record strip guides taken substantially along the line X—X of FIG. VII, certain adjuncts being omitted for clarity of illustration; and FIG. XI is a schematic view of a modified consecutive number device, the unmodified device being shown in front elevation in its position in the printer in FIG. VIII.

These specific figures and the accompanying description are intended merely to illustrate the invention and not to limit its scope.

For the purpose of illustration, the printer is shown in connection with an ordinary dial type weighing scale. Such a scale comprises a dial housing 1 that contains automatic load counterbalancing and indicating mechanism which includes an indicator 2 that is rotated through increments of angle which are proportional to increments of weight applied to the scale and that indicates such weights on a stationary indicia-bearing chart 3. The dial housing is mounted on the top of a scale column 4 of which only the top portion is shown in FIG. I.

Mechanical chart reading mechanism which is shown and described in U.S. application Serial No. 643,708, filed March 4, 1957, now U.S. Patent No. 2,948,463, is located within the dial housing 1 and is cable-connected to the printer which is contained within its housing 5 and case 6 and operated according to the scale readings. The printer may be operated by any of the usual means for setting up printing members, such as type wheels or sectors, or by hand.

The basic mechanism within the printer case 6 is shown and described in detail in the hereinbefore referred to U.S. application Serial No. 693,975. Referring to FIGS. II and III, cables 7, one for each decade in a four place number, are led through Bowden cable casings 8 that are attached by means of adjustment clips 9 to a stationary support 10 within the dial housing 1 and that run through an opening 11 in the dial housing 1 into the printer case 6. The ends of the cables 7 are connected to return springs 12 within the case 6. The basic printing mechanism is driven by means of a horizontal shaft 13 which is driven in turn by the motor of the mechanical chart reading mechanism within the dial housing 1 as described in the hereinbefore referred to U.S. application Serial No. 693,975. Every time that the chart reading mechanism makes a weight reading it sets up the basic printing mechanism by means of the cables 7 and also turns the shaft 13 through one revolution to make a print. The shaft 13 extends from the dial housing 1 into the printer case 6 to drive the mechanism therein and also carries a miter gear 14 which meshes with a cooperating miter gear 15 that drives that part of the printer mechanism (roller printer) contained within the printer housing 5. Every time that the horizontal shaft 13 is turned through one revolution it drives the miter gear 15 through one revolution.

The basic printing mechanism within the printer case 6 is driven by means of cams 16 and 17 (FIGS. IV and V) fixed to the shaft 13, the shaft 13 being journaled within the dial housing 1 in an extension of the support 10 (FIG. II) and within the printer case 6 in a vertical end frame 18 (FIGS. IV and V). Horizontal, sleeve-like spacers 19, two of which are shown in FIG. III, space the vertical end frame 18 from the dial housing 1, bolts 20 which extend through openings 21 in the end frame 18 and through the sleeve-like spacers 19 functioning to attach the end frame to the dial housing.

The cam 16 functions to reciprocate a cam follower plate 22, as indicated by the double-ended arrow in FIG. IV, that drives an inked ribbon reverse mechanism and a record strip mechanism. The cam follower plate 22 is connected to a slidable bar 23 by means of a toggle mechanism 24 which comprises a bracket 25 fixed to the slidable bar 23, an arm 26 pivotally mounted on the bracket 25 by means of a pivot pin 27, and a bowed spring 28 the ends of which engage in opposed V-notches in the bracket 25 and in the arm 26. An upwardly extending portion of the arm 26 is movable within limits defined by the ends of a notched-out portion 29 (FIG. V) of the bar 23, the bar 23 being slidable in the slotted arms 30 of a bracket 31 which is attached to the end frame 18 by means of screws 32. The bracket 31 also functions to support a shoulder screw 33 which cooperates with a horizontal slot 34 in the cam follower plate 22, the reciprocable plate 22 being slidable on the shoulder of the screw 33 and being pivotally attached on the upper end of the arm 26 of the toggle mechanism 24 by means of a pivot pin 35.

The end frame 18 has mounted therefrom a pair of shafts 36 and 37 (FIG. IV) on which is fixed a pair of ribbon spools 38 and 39 (FIGS. II, III, and VII), respectively. Adapted to be wound and unwound alternately on the spools 38 and 39 is an inked ribbon 40 which is moved back and forth through a printing station as indicated by the double-ended arrows in FIG. VII. Pinned to the shafts 36 and 37, respectively, is a pair of ratchet wheels 41 and 42 the teeth of which are arranged so that they are driven in opposite directions. Reciprocation of the cam folower plate 22 to the right as viewed in FIG. IV causes a pawl 43 (FIGS. IV and V) that is carried by an end of the slidable bar 23 and that extends through an opening 44 in the end frame 18 to cooperate with and drive the ratchet wheel 42 which rotates its spool 39 slightly so as to advance the ribbon 40. The slidable bar 23 and the toggle mechanism 24 are driven through a definite prescribed stroke which is less than the total range of travel of the slidable bar 23. When the toggle mechanism 24 is operated, the stroke of the slidable bar 23 is shifted from one end of its range of travel to the other. With the arm 26 of the toggle mechanism 24 at the left end of the notched-out portion 29, as shown in FIGS. IV and V, the slidable bar 23 and the toggle mechanism 24 are reciprocable in a stroke so that the pawl 43 drives the ratchet wheel 42 counterclockwise as viewed in FIG. IV and so that a pawl 45 that is carried by the other end of the bar 23 and that extends through an opening 46 in the end frame 18 is reciprocable in an area where it does not cooperate with and drive its ratchet wheel 41, the spool 38 carried by the shaft 36 acting as a supply roll for the ribbon 40 as the ribbon is wound upon the spool 39.

The bowed spring 28 acts as a compression link between the bracket 25 and the arm 26 of the toggle mechanism. The force exerted by the spring 28 tending to keep the arm 26 against one end or the other of the notched-out portion 29 is slightly greater than the force required to drive the spool on which the ribbon 40 is being wound. During operation, the spring force can be overcome when the pawl doing the driving can no longer rotate its ratchet its ratchet wheel, such as when the ribbon 40 tightens as it reaches its end on the supply roll. When the tension in the ribbon 40 increases to a certain point because the ribbon has reached its end, the pawl driving the ratchet wheel of the take-up spool prevents the slidable bar 23 from reciprocating. The reciprocating cam follower plate 22 continues to move, however, and in so doing actuates the toggle mechanism 24 to shift the stroke of the slidable bar 23 to wind the ribbon 40 on what formerly was the supply spool. When the toggle mechanism shifts to the right end of the notched-out part 29, as viewed in FIGS. IV and V, to shift the stroke of the slidable bar 23 from one end of its range of travel to the other. The slidable bar 23 and the toggle mechanism 24 then are reciprocable in a position so that the pawl 45 drives the ratchet wheel 41 clockwise as viewed in FIG. IV and so that the pawl 43 is reciprocable in an area where it does not cooperate with and drive its ratchet wheel 42, the spool 39 carried by the shaft 37 acting as a supply roll for the ribbon 40 as the ribbon is wound upon the spool 38. Hence, the inked ribbon 40 automatically is wound and unwound alternately on the spools 38 and 39 by the ribbon reverse mechanism.

Fixed respectively to the ratchet wheels 41 and 42 is a pair of grooved hubs 47 and 48 (FIG. VII) each of which receives a spring 49 which acts as a friction brake. The springs 49 are looped around the hubs 47 and 48 and have their opposite ends stationarily attached at 50 to the end frame 18. The springs 49 maintain the inked ribbon 40 under proper tension to present it to the printing station without too much slack and prevent the driven one of the spools 38 and 39 from backing up during the return stroke of the bar 23.

While the cam follower plate 22 is driving the inked ribbon 40 one way or the other, the plate 22 also drives the record strip mechanism in the direction indicated by the single-ended arrows in FIG. VII. The record strip mechanism includes a pair of shafts 51 and 52 (FIG. IV), a paper supply spool 53 (FIG. VII) rotatably journaled on shaft 51 and a paper take-up spool 54 (FIGS. II and III) fixed to turn as one with shaft 52, a translucent record strip 55 being drawn from the supply spool 53 and being wound upon the driven take-up spool 54. A friction brake spring 56 (FIG. VII), which is like the springs 49, cooperates with a grooved hub 57 on the spool 53 and functions to maintain the record strip 55 under proper tension.

The driven paper take-up spool 54 is turned by a drive which includes the reciprocable cam follower plate 22, a rockable plate 58 which is pivotable about the axis of a rotatable shaft 59 (FIGS. IV, VI and VII) and which is connected to the cam follower plate 22 by means of a stud 60 that engages a vertical slot 61 in the cam follower plate 22 (FIG. IV) and a driving pawl 62 which is attached to the rockable plate 58. Horizontal reciprocation of the cam follower plate 22 rocks the plate 58 about the axis of the shaft 59. Clockwise rocking of the plate 58, as viewed in FIG. IV, causes the driving pawl 62 to turn a ratchet wheel 63 clockwise, the wheel 63 being fixed to the shaft 59 which is journaled in the end frame 18. The teeth on the ratchet wheel 63 are arranged so that the wheel is driven in the one direction only, an anti-backup pawl 64, which is urged in a clockwise direction by a spring 65 connected between the end frame 18 and the pawl 64, preventing counterclockwise rotation of the ratchet wheel 63 as viewed in FIG. IV.

The ratchet wheel 63 which is fixed to the shaft 59 turns the shaft and a rubber pinch roll 66 attached to the shaft counterclockwise as viewed in FIG. VII. A second rubber pinch roll 67, in spring-urged contact with the first pinch roll 66, is carried by a bracket 68 on a shaft 69 that is held in place on the end frame 18 by a nut 70*a* (FIG. IV). The pair of rubber pinch rolls 66 and 67 is a gear connected as shown in the hereinbefore referred to U.S. application Serial No. 693,975 by means of a pair of spur gears (not shown) one fixed to the shaft 59 and one fixed to a shaft 70 on which the second rubber pinch roll 67 is mounted, the shaft 70 being journaled in the bracket 68. The pair of spur gears insures that the pinch rolls 66 and 67 move together, the first roll 66 turning counterclockwise and second roll 67 turning clockwise as viewed in FIG. VII.

The pinch roll 67 is spring-urged into contact with the drive roll 66 to pinch the record strip 55 therebetween.

The drive roll 66 is carried on the ratchet driven shaft 59 so that it turns a fixed amount for each printing operation thus spacing printed impressions uniformly along the length of the strip. The take-up spool 54, however, is driven by a belt 71 (FIG. III) (preferably a spring belt) which stretches and slips to maintain a generally constant tension on the record strip 55 as it winds on the spool 54. The belt 71 connects a groove 72 (FIG. VI) in a hub 73 that turns as one with the ratchet driven shaft 59 to a circumferential groove 74 (FIG. III) in the paper take-up shaft 52.

The free ends of the inked ribbon shafts 36 and 37 and of the record strip shafts 51 and 52 are journaled in eccentric bearings 75 (FIG. VIII) which are adjustably attached to a removable end plate 76 by means of nuts 77. The end plate 76 is removably mounted on the ends of a pair of horizontal spacer posts 78, that are fixed at 79 (FIG. VIII) to the end frame 18, by means of a pair of spring urged-apart clamps 80 which are slidably mounted on the end plate 76 by means of shoulder screws 81. The plate 76 is removed by pinching ears 82 on the clamps 80 together so that the ends of the clamps 80 are withdrawn from grooves 83, one of which is shown in FIG. VIII, in the ends of the horizontal posts 78 to obtain access to the interior of the printer. Parallelism of the inked ribbon shafts 36 and 37 and of the record strip shafts 51 and 52 is adjusted by loosening the nuts 77 and by pivoting the bearings 75.

The inked ribbon 40 is guided around the outer surface of a U shaped strip 84, as illustrated in FIGS. II, III and VII. A second similarly shaped strip 85 which is in very slightly spaced relationship with the first strip functions as a guide for the record strip 55, the strip being moved between the strips or guides. The bottoms of the guides 84 and 85 each define an open ended slot 86 which in turn defines a printing station 87. As shown in FIG. X, the slots 86 open toward the end frame 18 to which the guides are removably attached as hereinafter described. A feature of the printer is in the design of the ink ribbon and record strip guides 84 and 85 which permits them to be removed without dismantling any parts of the printer in a matter of seconds so that printing type, hereinafter described, can be cleaned.

The left hand ends of the guides 84 and 85 as viewed in FIG. VIII are spaced slightly apart by means of a pair of relatively narrow spacers 88 each of which extends from a point above guide 84 down to a slot 86. The right hand ends of the guides are spaced a similar distance by means of dimples 89 on the inner surface of guide 84, the U-shaped space 90 between the guides having its edges defined by the spacers 88 on the one hand and the dimples 89 on the other receiving the record strip 55.

The guides 84 and 85 are welded to the spacers 88 to make a unit assembly. A pair of blocks 91 is secured to the inner surface of guide 85 at the spacers 88 by means of screws 92, one being at each of the upper ends of guide 84. Each of the blocks 91 is provided with a stud 93 which studs are received in horizontal openings in the end frame 18 for the purpose of removably mounting the guides thereon. A latch bar 94 slidably mounted for motion in a horizontal path on the end frame 18 by means of shoulder screws 95 has an opened ended catch slot 96 which, when the latch bar 94 is in locked position as shown in FIGS. IV and X, is received in a circumferential groove 97 in the left hand one of the studs 93 as viewed in FIG. X, the stud 93 extending through the end frame 18 into the path of the latch bar 94. The latch bar 94 has a closed ended catch slot 98 having an enlarged end 99 which slot is received in a circumferential groove 100 in the other one of the studs, such stud also extending through the end frame 18 into the path of the latch bar 94. When the latch bar 94 is in locked position, the enlarged end 99 of the catch slot 98 is positioned to the right of the stud 93 as viewed in FIG. IV. Finger pressure on the handle 101 of the latch bar 94 moves the bar to the left as viewed in FIG. IV to position the enlarged end 99 of the catch slot 98 at its stud 93 and moves the opened ended catch slot 96 out of its cooperating relationship with its stud 93 to free the studs so that the guides 84 and 85 can be removed from the end frame 18 in a direction parallel to the axes of the studs.

When the ink ribbon and record strip guides 84 and 85 are locked in place on the end frame 18, the guides are rigidly supported, since their ends at the end frame 18 are securely held to the end frame and their ends remote from the end frames are of solid construction, the open ended slots 86 in the bottoms of the guides not extending all of the way back to such remote ends of the guides. However, when the studs 93 are removed from their openings in the end frame 18, the open ended slotted construction of the guides causes them to flexibly separate or more or less fall apart at the end frame 18 so that the blocks 91 can clear any obstructions as hereinafter described as the guides are removed as a unit assembly from the printer. The record strip 55 is threaded between the guides 84 and 85 when they are locked on the end frame 18 by pushing an edge of the record strip edgewise past the dimples 89 until the record strip is received in the space 90 between the guides. As the record strip is moved during printing cycles between the guides, its edges are guided between the spacers 88 on the one hand and the dimples 89 on the other.

It is not practical to attempt to have the printing sectors 104 positioned exactly by the chart reading mechanism because of the usual manufacturing tolerances necessary in mass production. Therefore, the printing sectors 104 are pivoted clockwise, as viewed in FIG. VII, about the axis of the sector shaft 106 by the cables 7 which are operated by the chart reading devices only to approximate printing positions. Clockwise pivoting of the printing sectors 104 extends the return springs 12. Final positioning of the printing sectors 104, i.e., accurate aligning for the printing operation, is accomplished by means of a single centering and locking detent bar 114 that is carried horizontally between a pair of detent actuating links 115 and that is received in locating slots 116 (FIG. XI) in the printing sectors 104 to pivot the printing sectors 104 clockwise additionally into accurately aligned relationshhip with each other so that the printed matter appears in a straight line. After finally aligning the printing sectors 104, the detent bar 114 locks the sectors so that they do not move during the printing operation.

The detent actuating links 115 are each slidable in a grooved bushing 117 (FIG. VIII) on the stationary sector shaft 106, slots 118 (FIG. VII) in the links 115 being received in the grooves in the bushings. The detent bar 114 is carried between the links 115 near the bottoms of the links, the upper ends of the links 115 each being pivotally connected to a short arm 119 at 120 each of which arms is clamped, by means of bolt 121 and nut 122, to a shaft 123 that is mounted for rotation from the end frame 18. The shaft 123 is driven by a long arm 124 (FIG. IV) that is keyed to the shaft 123 at its upper end and that carries a cam following roller 125 at its lower end, the roller 125 constantly being urged into contact with the periphery of the cam 17 by means of a spring 126 interconnecting the lower part of the long arm 124 and a stationary bracket 127 that is attached by means of screws 128 to the end frame 18.

While the chart reading device is setting up the printing sectors 104, the cam following roller 125 is on a high part 129 of the cam 17 as illustrated in FIG. IV. Movement of the roller 125 onto the high part 129 of the cam 17 pivots the shaft 123, operatively connected to the roller by means of the long arm 124, clockwise to lift the pair of detent actuating links 115 into their positions indicated in FIG. IV. In such position of the long arm 124, the detent bar 114 is lifted out of the locating slots 116 by the links 115 so that the printing sectors 104 are freely movable by the cables 7. Movement of the roller 125 onto the low part 130 of the cam 17 permits the spring 126 to draw the long arm 124 against a resilient stop 131 mounted on the bracket 127. In such position of the long arm 124, the detent actuating links 115 are lowered and the detent bar 114 is received in the locating slots 116 of the printing sectors 104 as illustrated in FIG. VII to finally align and lock the printing sectors 104 prior to the roller printing operation.

Referring to FIGS. VII and VIII, the bushing 117 for the left hand detent actuating link 115 is spaced from the end frame 18 by means of a spacer 136 on the sector shaft 106 which spacer extends through a stationary strut 137 that is fixed on the cable guide shaft 110 and that functions to take part of the thrust applied by a roller printer which is contained within the printer housing 5. A pair of spacers 138 separates such bushing 117 from the adjacent one of the printing sectors 104 which as hereinbefore described are separated from each other by spacers 107. The left hand one of the spacers 107 can be omitted and a punctuation plate substituted in its place. Such a punctuation plate is not shown for clarity of illustration but it may be like the stationary strut 137 except that on its lower end it carries a printing character which prints an appropriately placed comma in the four place printed number. The punctuation plate also may be used to print appropriately placed decimal points in some applications.

Additional spacers 139 separate a second stationary strut 140 from the right hand one of the printing sectors 104. The strut 140 is fixed on the cable guide shaft 110, like the first strut 137, has a hole through which the stationary sector shaft 106 passes, has a large clearance hole 141 to allow for movement of the detent bar 114, and has the same function as the strut 137, i.e., to take part of the thrust imparted by the roller printer. In addition, the second strut 140 functions to print "LB." by means of type 142 fixed to its lower end. An auxiliary printing sector 143 which is like the sectors 104 is mounted on the shaft 106 and is separated from the strut 140 by means of spacers 144, the hub 145 of the sector 143 being against the right hand one of the bushings 117. The printing sector 143 is mounted on the shaft 106 in the same way that the sectors 104 are and has locating slots 146 (FIG. VII) like the locating slots 116 in the sectors 104 and type 147 in the printing station 87.

While the detent bar 114 is received in the locating slots 116 and 146 of the printing sectors 104 and 143, respectively, as illustrated in FIG. VII to finally align and lock the sectors, roller printer mechanism contained within the printer housing 5 completes the printing operation. The structure and operation of the roller printer is shown and described in the hereinbefore referred to U.S. application Serial No. 693,975. A ticket or other element 148 (FIGS. I–III) is placed in a narrow opening 149 between the bottom of the printer case 6 and the top of a table 150 which supports the ticket to receive an imprint in juxtaposition with the printing type 108, 142 and 147 in the printing station 87. The ticket 148 is pressed against the inked ribbon 40, the inked ribbon against the translucent record strip 55, and the record strip against the face of the type. Since the inked ribbon is pinched between the ticket 148 and the translucent record strip 55, an inked imprint is made on the ticket and a similar inked imprint is made on the continuous strip for record purposes, the imprint on the ticket being read directly while the imprint on the record strip is read through the translucent strip from the back or unprinted side of the strip.

In the overall operation of the printer, every time that the horizontal shaft 13 is turned through one revolution it turns the cams 16 and 17 counterclockwise as viewed in FIG. IV through one revolution. The chart reading mechanism which is located within the dial housing 1 makes a weight reading and sets up, by means of the cables 7, the weight printing sectors 104 according to the scale reading, the detent bar 114 being lifted out of the locating slots 116 and 146 by the links 115 so that the printing sectors 104 are freely movable by means of the cables 7 while the reading of the chart takes place. While the chart reading device is setting up the printing sectors 104, the cam following roller 125 is on the high part 129 of the cam 17 as illustrated in FIG. IV.

After the chart reading device completes its work by moving all of the weight printing sectors 104 fully over, i.e., away from "E" (error) toward "9" (FIG. XI) and beyond and then allowing them to return each to its own selected digit position (less a small increment to insure accurate final positioning by the detent bar 114), during which time the inked ribbon and record strip cam 16 is returning the ratchet wheels 42 and 63 "free," the cam following roller 125 moves immediately from its position shown in FIG. IV down onto the low part 130 of the cam 17 permitting the spring 126 to draw the long arm 124 against the resilient stop 131 to lower the detent actuating links 115 so that the detent bar 114 is received in the locating slots 116 and 146 of the printing sectors 104 and 143, respectively, to finally align and lock the printing sectors prior to the roller printing operation.

As illustrated in FIG. IV, as soon as the cam following roller 125 moves down onto the low part 130 of the cam 17, the inked ribbon and record strip cam 16 starts idling through a "backlash" or "free" zone wherein no contact is made with the cam follower plate 22. While the cam following roller 125 moves along the periphery of the low part 130 of the cam 17, during which time the inked ribbon and record strip cam 16 moves through the "backlash" zone, the printing sectors 104 and 143 are finally aligned and locked and no movement of the inked ribbon 40 or the record strip 55 occurs and the printing roller (not shown) within the housing 5 travels across the face of the printing type.

As soon as the printing roller completes its travel, the cam following roller 125 returns to the high part 129 of the cam 17 to unlock the printing sectors and the reciprocable cam follower plate 22 is so moved by the cam 16 that the ratchet wheels drive the inked ribbon and record strip to advance them. The cycle now is complete, the printing sectors again being free and fresh portions of the inked ribbon and record strip being advanced into the printing station. When the chart reading device again makes a weight reading, the inked ribbon and the record strip already are positioned in the printing station and the inked ribbon and record strip cam 16 returns the ribbon ratchet wheels and the record strip ratchet wheel free while the weight reading takes place.

The type 147 on the printing sector 143 may print a wide variety of auxiliary information. For example, customer order or code numbers, or such load identification information as "Ore," "Limestone," "Tare," "Gross," and "Net" can be printed.

The flexible arrangement of the weight printing sectors 104 and the auxiliary information printing sector 143 is provided so that the sectors can be positioned axially on the sector shaft 106 to suit many different printing applications. As illustrated in FIG. VIII, there are four weight printing sectors 104, one for each decade in a four place number to print as high as 9,999 LBS., and a single auxiliary sector 143. It is possible to increase the number of auxiliary sectors 143 to twelve by replacing spacers on the sector shaft 106 with sectors and respacing the detent operating links 115 and changing the length of the detent bar 114 to accommodate the increased number of sectors. The printing sectors can be located anywhere along the sector shaft 106 from about their positions shown in FIG. VIII to the end frame 18. Also, gaps can be left in the printed line for customer use by suitably separating the printing sectors by means of spacers on the shaft.

After the printing sectors 104 and 143 are spaced on the shaft 106 to suit a particular industrial installation, the return springs 12 for the weight printing sectors 104 are hooked on the threaded rod 105 directly over the sectors. Also, the return springs for the auxiliary printing sectors are similarly hooked on the threaded rod 105. Only one auxiliary sector 143 is shown for the sake of simplicity. It is rotated into printing position by punching any one of the vertical row of keys or buttons 151 shown on the front of the printer case 6 in FIG. I, there being ten of the keys representative of the numbers from zero through nine.

Return spring 152 for the single sector 143 is like the return springs 12 and is connected to a cable 153 which is connected to the hub 145 of the sector 143 like the cables 7 are connected to their respective hubs and which is run through a casing 154 that is supported in the cable guide shaft 110 like the cable casings 8 are.

The other end of the casing 154 is clipped at 154*a* to a support bar 154*b* (FIG. III) and the other end of the cable 153 is connected to an arm 155 (FIG. III) secured to a rocker bar 156 of the vertical bank of keys 151, the rocker bar 156 being pivoted by means of the keys 151 selectively to move the arm 155 and thus, the sector 143. The bank of keys is like the bank of keys shown in FIG. IV of U.S. Patent No. 2,746,384. Depression of key "3," for example, shown in FIG. I causes rotation of printing sector 143 into a corresponding position. The broken lines in FIG. I indicate that additional vertical rows of keys can be added as required, there being one row for each sector 143.

The common key release member shown in FIG. IV of said patent is identified in present FIG. III by the reference character 157. Member 157 functions to release the latched ones of the keys in the same way that the keys shown in the patent are released, the member 157 being secured to a rocker bar 158 which is pivoted at its ends 159 in a bracket 160 that is suitably mounted within the case 6. Depression of a key release bar 161 (FIG. III) conveniently mounted in juxtaposition with the keys 151 which has a pair of legs 162 extending through openings in the bracket 160 and through openings in a plate 163 carried by the bracket 160 moves a yoke 164 connecting the legs against a cam 165 secured to the rocker bar 158 rocking the bar 158 to move the key release member 157. Springs 166 around the legs 162 between the bracket 160 and the plate 163 returned the key release bar 161 to its original position when finger pressure on it is removed.

It often is desirable to print a consecutive number adjacent each weight print. This is accomplished automatically by means of a consecutive number device 167 shown in FIG. VIII. It comprises a pair of spaced and rigidly interconnected struts 168 on the shaft 106 which struts are each provided with a slot 169 at their upper ends that receives the cable guide shaft 11 in a snug fit all around the shaft except at the top of the shaft to facilitate sliding the number device 167 axially on the shafts 106 and 110. The snug fit at the sides of shaft 110 prevents the number device 167 from turning about the axis of shaft 106 and the snug fit at the bottom of shaft 110 causes the struts 168 to transfer part of the thrust applied by the roller printer to shaft 110 which is of rugged construction. The lower ends of the struts 168 support between them a plurality of rotatably mounted printing wheels in the printing station 87 which wheels for the sake of simplicity are identified by the single reference character 170. These wheels are like those found in an ordinary rubber date stamp and can be turned by finger pressure. A comb spring detent 171 allows the printing wheels to be turned only in one direction. A crank arm 172 operatively connected to the wheels is connected by means of a pin 173 to the right hand one of the detent operating links 115 as viewed in FIG. VIII, the pin being received in a snug fit in a horizontal hole in such link. Everey time that the links 115 are moved up and down during a printing cycle, the crank arm 172 on the consecutive number device 167 is moved up and down to automatically advance the wheels one count.

The consecutive number device 167 can be modified for repeat printing as shown in FIG. XI. If several identical tickets are to be printed, the consecutive number device hereinbefore described must be reset by hand to repeat the same number. Similar reference numbers in FIGS. VIII and XI identify parts which are alike in structure and in function. The modified consecutive number device 167*a* has its pin 173*a* received in a slot 174 in a detent operating link 115*a*. Normally, a spring 175 carried by the link 115*a* pulls an arm of a bell crank 176 pivoted on the link 115*a* against a stop 177 also on the link 115*a*. This is the position of the bell crank 176 as shown in solid lines in FIG. XI wherein surface 178 on the bottom of the arm of the bell crank holds the pin 173*a* in a locked position down in the bottom of the slot 174. Movement of the detent operating links 115*a* up and down during a printing cycle moves a crank arm 172*a* up and down to automatically advance the printing wheels 170*a* of the consecutive number device. To prevent the consecutive number device 167*a* from being advanced during repeat printing, a stationarily mounted solenoid 179 is energized to move a roller 180 operatively connected thereto into the path of the other arm of the bell crank 176. This causes the bell crank to pivot clockwise about its pivot point 181 on the link 115*a* on the downward stroke into its position shown in broken lines. The lower surface 178 on the bell crank 176 moves out of its cooperating relationship with the pin 173*a* and as the links 115*a* continue to move downward the slot 174 in the link moves relative to the pin 173*a* and the driving connection between the links 115*a* and the consecutive number device 167*a* is broken.

It also often is desirable to print the date and/or the time along with each weight print. This is accomplished by means of a stamp 182. As illustrated in FIGS. VII and VIII, the stamp 182 is a manually operated date stamp comprising a pair of struts 183 on the shaft 106 which are like and interconnected like the pair of struts 168 of the consecutive number device 167 and which are mounted on the shafts 106 and 110 like the struts 168, each of the struts 183 being provided with an opening 184 in which the shaft 110 is received in a snug fit all around the shaft except at the top of the shaft. A spacer 185 on the shaft 106 separates the consecutive number device 167 from the adjacent bushing 117 on the shaft and a spacer 186 on the shaft separates the consecutive number device 167 from the date stamp 182. The lower ends of the struts 183 support between them a plurality of rotatably mounting printing wheels in the printing station 87 which wheels for the sake of simplicity are identified by the single reference character 187. These wheels are like those found in an ordinary rubber date stamp and can be turned by finger pressure. A comb spring detent 191 allows the printing wheels to be turned only in one direction. The date stamp 182 is removed everyday that the printer is used and the printing wheels advanced to the correct date. Alternatively, an ordinary electric clock mechanism can be mounted between the struts 183 above the printing wheels 187 to advance the wheels automatically. Also, the printing wheels 187 in such an arrangement, instead of just printing the date, can print the time and the date. The several printing mechanisms and their respective spacers are held in place on the shaft 106 by means of a collar 188 that is retained on the shaft against the last printing mechanism by means of a set screw 189.

After the weight printing sectors 104, the selective numbers printing sectors 143 and the struts 137 and 140 are positioned on the shaft 106 to suit a particular installation, and if such installation does not require the printing of consecutive numbers or date information or time information, the collar 188 is positioned on the shaft 106 against the right hand one of the bushings 117 as viewed in FIG. VIII. However, if, after the printer has been in use for a while, it is desired to print consecutive numbers and date and/or time information, the consecutive number device 167 and the stamp 182 can be added in a matter of seconds by opening the door 190 (FIG. III) of the printer case 6, removing the collar 188, and sliding the spacer 185, the consecutive number device 167, the spacer 186, and the stamp 182 on the shaft 106, the pin 173 of the consecutive number device being received in the hole in the detent operating link 115 for automatic operation as hereinbefore described. As shown in FIG. VII, no parts of the printer interfere with the consecutive number device 167 or the stamp 182, such device 167 and stamp 182 being slid axially on the shaft 106 with their respective slots 169 and 184 receiving the cable guide shaft 110 as hereinbefore described. Hence, no parts of the printer need be dismantled in adding or removing the device 167 and/or the stamp 182. Conversely, the consecutive number device 167 and the stamp 182 can be removed in a matter of seconds in the field to adapt the printer to changed conditions. Also, the printer may be used with just one or the other of the consecutive number device 167 and the stamp 182 operatively mounted therein. When the weight printing sectors 104, the selective numbers printing sector 143, the consecutive numbers device 167, and the time and/or date stamp 182 are positioned in the printer as shown in FIG. VIII, the roller printer rolls along the printing station 87 and presses the ticket 148 against the inked ribbon 40, the inked ribbon against the record strip 55, and the record strip against the face of the type of the several printing mechanisms to print straight lines of printed matter with the several items of separate information spaced to suit the user of the printer and with gaps left between any of the several items of separate information if such are desired by such user. The weight printing sectors 104 are the basic printing mechanisms common to every printer that is used in conjunction with a weighing scale, the auxiliary printing mechanisms being arranged on the production line to suit many different printing applications so that, in effect, custom printers can be produced by production line methods.

Heretofore, the printing type in industrial printers have been very difficult to clean because access to such type was difficult. The feature of the present printer is in the mounting means for and the design of the ink ribbon and record strip guides 84 and 85 which permits them to be removed without dismantling any parts of the printer in a matter of seconds to facilitate cleaning the type.

Access to the printer is gained by opening the door 190 (FIG. III) of the printer case 6. This exposes the ink ribbon and record strip guides 84 and 85 which as hereinbefore described are connected together to form a unit assembly. As also hereinbefore described, the guides 84 and 85 are removed by moving the latch bar 94 to its unlocked position by means of finger pressure on its handle 101 and removing the studs 93, carried by the guides 84 and 85, from their openings in the end frame 18, the ink ribbon 40 and the record strip 55 being removed from the guides for the cleaning operation. As viewed in FIG. VII, it appears that some of the printing sectors may obstruct such removal of the guides. Actually, however, there is no problem. In the first place, all of the printing sectors are operated by hand, when the type are to be cleaned, to position the printing sectors in a centered position relative to a vertical line dropped from the sector shaft 106. This in itself makes it possible to withdraw the strip guide assembly from the printer without dismantling any parts. In the second place, the open ended slotted construction of the guides (slot 86) as hereinbefore described causes them to flexibly separate at the end frame 18 so that the blocks 91 secured to the guides move apart from each other to facilitate clearing any obstructions that may be in the way.

It has been found that the users of the present printer leave the cleaning of the printer go until the record strip is exhausted. The printer usually is cleaned and then a fresh record strip is installed. The particular printer which is illustrated is one having a consecutive number device 167 (FIG. VIII) and a date and/or time stamp 182 (FIG. VIII) requiring a wide record strip and inked ribbon. However, many of the printers are built and sold without such consecutive number device and stamp and, therefore, with a narrow record strip and inked ribbon making removal of the record strip and inked ribbon relatively easy. The record strip is removed prior to the removal of the guide assembly with no danger of tearing. This is accomplished by first removing end plate 76 (FIG. VII) to expose spools 53 and 54. The supply roll and the take up roll of paper are pulled out of the machine while the paper is worked out of the guide assembly to leave the assembly free for removal from the printer.

The embodiment of the invention described in connection with the drawings is to be regarded as illustrative only since the invention is susceptible to variation, modification and change within the spirit and scope of the appended claims.

This application is a division of application Serial No. 744,754, filed on June 26, 1958 in the name of Geoffrey T. Gray.

Having described the invention, I claim:

1. In a printer, in combination, a frame, a shaft attached to the frame, a plurality of members carrying printing type rotatably mounted on the shaft and adapted to be selectively positioned in a printing station, an ink ribbon, guide means, formed from a curved strip which defines an opening in registry with said printing station, for guiding the ink ribbon through the printing station in a path juxtaposed to the type, the guide means being removable from the printer independently of the ink ribbon, and latch means on the frame for removably securing the guide means thereto, the guide means being removed from the frame to expose the printing type to facilitate cleaning the type by movement in a path substantially parallel to the shaft.

2. In a printer, in combination, a frame, a shaft attached to the frame, a plurality of members carrying printing type rotatably mounted on the shaft and adapted to be selectively positioned in a printing station, an ink ribbon, a record strip, a pair of guides that are secured together in slightly spaced relationship to form a unit assembly, one of the guides guiding the ink ribbon through the printing station in a path juxtaposed to the type, the record strip being guided between the guides through the printing station in a path which is between the type and the ink ribbon, and latch means on the frame for removably securing the guides thereto, the guides being removed from the frame as a unit assembly to expose the printing type to facilitate cleaning the type by movement in a path substantially parallel to the shaft.

3. A printer according to claim 2 wherein each of the guides is formed from a similarly curved strip each defining an opening in registry with said printing station.

References Cited in the file of this patent

UNITED STATES PATENTS

| | | |
|---|---|---|
| 1,849,921 | Green | Mar. 15, 1932 |
| 2,188,261 | Basquin | Jan. 23, 1940 |
| 2,230,682 | Fuller | Feb. 4, 1941 |
| 2,264,855 | Pasinski | Dec. 2, 1941 |
| 2,356,951 | Runton | Aug. 29, 1944 |
| 2,361,662 | Spurlino | Oct. 31, 1944 |
| 2,735,362 | Williams | Feb. 21, 1956 |
| 2,777,385 | Bachy | Jan. 15, 1957 |
| 2,780,165 | Kuhn | Feb. 5, 1957 |